United States Patent

Forterre et al.

[11] Patent Number: 4,457,464
[45] Date of Patent: Jul. 3, 1984

[54] METHOD OF FIXING A FERRITE TO A METAL PIECE

[75] Inventors: Gérard Forterre; Pierre Hartemann, both of Paris, France

[73] Assignee: Thomson-CSF, Paris, France

[21] Appl. No.: 337,614

[22] Filed: Jan. 7, 1982

[30] Foreign Application Priority Data

Jan. 13, 1981 [FR] France ............................. 81 00472

[51] Int. Cl.³ ............................................. H01P 11/00
[52] U.S. Cl. .................................... 228/124; 228/903; 156/325; 29/603
[58] Field of Search ................... 228/122, 124, 163.12, 228/903; 156/325; 29/603

[56] References Cited

U.S. PATENT DOCUMENTS

| | | | |
|---|---|---|---|
| 3,662,291 | 5/1972 | Cotter | 333/1.1 |
| 3,873,944 | 3/1975 | Vaguine et al. | 228/124 |
| 3,886,025 | 5/1975 | Riseman | 156/325 |
| 4,034,377 | 7/1977 | Knox et al. | 333/1.1 |
| 4,172,318 | 10/1979 | Huntt | 29/603 |
| 4,260,966 | 4/1981 | Boutros | 333/185 X |

FOREIGN PATENT DOCUMENTS 2443750  7/1980  France .

Primary Examiner—Kenneth J. Ramsey
Attorney, Agent, or Firm—Roland Plottel

[57] ABSTRACT

In a method for fixing a ferrite to a metal piece such as a pole-piece of a magnetic polarizing circuit of a microwave device, a first step consists in depositing a nonresistive metal on the ferrite face to be fixed. A second step consists in applying a very thin layer of heat-conducting adhesive on the metallized ferrite face and bonding the ferrite to the metal piece, thus ensuring low thermal resistance, very low insertion loss and high power capability.

8 Claims, 2 Drawing Figures

FIG_1
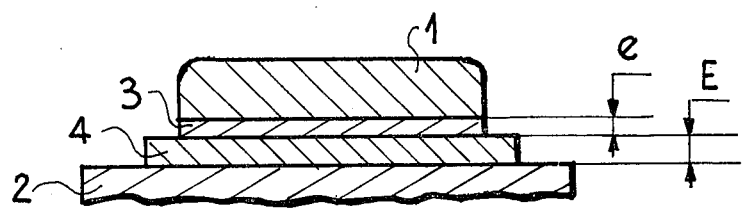
FIG_2
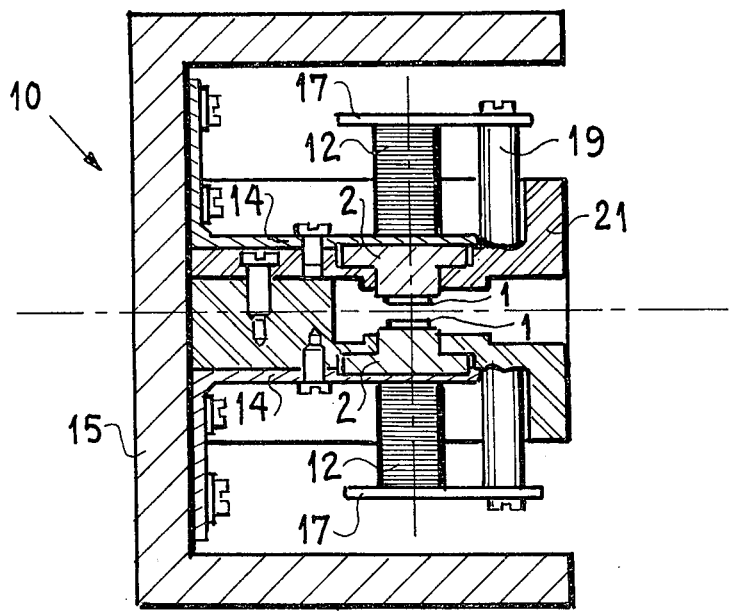

METHOD OF FIXING A FERRITE TO A METAL PIECE

This invention generally relates to microwave devices provided with ferrites and designed to carry high means powers. The invention is more particularly concerned with a method of fixing a ferrite to a metal piece such as, for example, a pole-piece of the magnetic polarizing circuit of a microwave device.

It is known that, as a general rule, the behavior of a ferrite-type microwave device as a function of power is dependent on the temperature finally attained by the ferrites. Thus in order to fabricate a high-power microwave device such as, for example, a circulator of the three-port Y-junction type, there are different alternative procedures which consist:

in reducing the losses of the ferrite;
in reducing the thermal gradients within the ferrite;
in reducing the thermal resistance between the ferrite and the metal wall of said device.

The first two procedures relate to the mode of operation of the device which has to be adapted to the stresses arising from the power level at which the device operates.

The third and last procedure mentioned above is purely technological and has already formed the subject of many tests. To this end, the nature of the means employed for fixing the ferrite to the metal wall must satisfy the following requirements:

the fixing means must neither be subject to microwave losses nor have the effect of increasing such losses at the surface of the ferrite;
said means must have the lowest possible thermal resistance;
they must be capable of withstanding high thermal gradients;
they must not introduce stresses within the ferrite in order to forestall any danger of fracturing of this latter at the time of power application.

Different techniques for fixing a ferrite to a metal piece are already known. One of these techniques consists simply in making use of an insulating adhesive such as Araldite, trademark of the Ciba-Geigy Corporation, in the fluid state, for example. However, an adhesive of this type is brittle, has low thermal conductivity and does not readily polymerize when it has a very small thickness.

Another known technique for fixing a ferrite to a metal piece consists in metallizing the bonding face of the ferrite by thin-film deposit of metals such as copper and gold, for example, then in soldering that face of the ferrite which has thus been metallized to the metal piece. A detailed description of this method will be found in U.S. Pat. No. 3,940,051 filed on Oct. 8, 1974.

However, a method of metallization and soldering of this type is attended by drawbacks. In fact, deposit of metals in a thin-film is performed at high temperature, which tends to impair the dielectric and magnetic loss angles and consequently to increase the insertion losses of the microwave device. Furthermore, the use of a metal such as gold considerably increases the cost of manufacture of the device.

The aim of the present invention is to overcome these disadvantages and to satisfy the requirements mentioned above by proposing a novel method of fixing a ferrite to a metal piece. The practical application of the method is straightforward, inexpensive and wholly satisfactory in regard to the power level which a microwave device is capable of withstanding.

To this end, the invention is directed to a method of fixing a ferrite to a metal piece, comprising the following steps:

deposit of a nonresistive metal on the face of the ferrite to be fixed;
bonding of the metallized face of the ferrite to the metal piece by means of a heat-conducting adhesive.

It is thus apparent that the deposit of a non-resistive metal such as aluminium, for example, will perform the function of a metallic barrier to microwave frequencies, thus making it possible to prevent any increase in losses at the surface of the ferrite. In order to join the two pieces together, it will consequently be possible to use any type of adhesive which has good thermal conductivity even though it may be of very inferior quality from the point of view of insertion loss in a microwave system.

Other features of the invention will be more apparent to those skilled in the art upon consideration of the following description and accompanying drawings, wherein:

FIG. 1 is a sectional view of a ferrite fixed to a metal piece by application of the method according to the invention;

FIG. 2 is a sectional view of a microwave circulator of the three-port Y-junction type in which each ferrite is fixed to a pole-piece by means of the method according to the invention.

In one example of construction shown in FIG. 1, the reference numeral 1 designates a ferrite which belongs either to the class of soft ferrites or to the class of microwave ferrites, said ferrite being intended to be fixed to a metal piece 2.

The first operation of the method of fixing according to the invention consists in forming a thin deposit 3 of nonresistive metal or in other words a metal such as aluminium or copper, for example, which does not introduce any resistance in the ferrite. Said deposit is formed without any bonding undercoat on the fixing face of the ferrite 1 for example in the form of a thin disk. Deposit of nonresistive metal may be performed by cathode sputtering of the triode type or by any other suitable method of direct deposit of said metal.

The thickness e of the deposit 3 of nonresistive metal is relatively substantial, namely within the range of 5 to $10\mu$ according to the frequencies, thus constituting a veritable metallic barrier to microwave frequencies.

The following operation of the method consists in applying a bonding layer 4 on the face of the ferrite 1 which has thus been metallized in order to affix said face to the metal piece 2 by means of an adhesive which has good thermal conductivity and is capable of polymerizing in a small thickness. By way of example, a suitable adhesive can consist of Araldite, trademark of the Ciba-Geigy Corporation, loaded with silver in the powdered state. Deposit of this heat-conducting adhesive is carried out in a thin layer having a thickness E of the order of 0.03 mm.

The application of the method of fixing according to the invention by means of a metallization layer 3 followed by a bonding layer 4 makes it possible to obtain a degree of thermal resistance between the ferrite 1 and the metal piece 2 which is as low as the thermal resistance obtained by means of conventional methods and has the further advantage of preventing any increase in insertion losses of the ferrite.

The method of fixing described in the foregoing is applicable to any microwave device comprising ferrites.

Typical ferrite microwave devices which may be mentioned by way of example without thereby implying any limitation include the three-port Y-junction power circulator, the four-channel power duplexer, and the remanent power-type phase shifter.

In the sectional view of FIG. 2, elements which are identical with those of FIG. 1 are designated by the same reference numerals. This figure shows a three-port Y-junction microwave power circulator 10.

This circulator 10 is constructed by means of waveguide section and comprises two ferrites 1 for microwaves. Said ferrites each consist of a thin disk of lithium ferrite, for example, and are placed in oppositely-facing relation.

Each ferrite disk 1 is fixed on a metal piece 2 by means of the method according to the invention. More specifically, each metal piece 2 constitutes the pole-piece of soft iron, for example, of a permanent magnet 12 which serves to polarize each ferrite. A thermal matching member 14 of copper, for example, is interposed between each pole-piece 2 and each magnet 12 and is rigidly fixed by means of any suitable fixing system to a heat-dissipating element consisting, for example, of an external radiator 15. A magnetic circuit for the polarization of each ferrite is closed by means of a yoke 17 made of soft iron, for example, and rigidly fixed to each magnet 12, and by means of metal columns, one of which is shown in FIG. 2 and designated by the reference numeral 19. The flange of one of the waveguide sections constituting the circulator 10 is designated by the reference numeral 21.

By way of illustration, the Assignee has fabricated a three-port Y-junction microwave power circulator designed for operation within the frequency band ranging from 14 to 14.5 GHz and provided with two disks of lithium ferrite. Said circulator is designed for a rated power of 750 watts and the insertion losses of the circulator are of the order of 0.08 dB within the frequency band considered. In the case of a circulator of this type in which ferrite elements are fixed to the pole-pieces in accordance with the invention, practical tests have demonstrated that the circulator was capable of withstanding power levels substantially four times higher than a circulator in which the ferrite elements are simply bonded to the pole-pieces.

What is claimed is:

1. A method of fixing a ferrite to a metal piece for a high-power microwave device, comprising the following steps:
   deposit of a nonresistive metal on the face of the ferrite to be fixed;
   bonding of the metallized face of said ferrite to the metal piece by means of a heat-conducting adhesive.

2. A method as claimed in claim 1, wherein deposit of a nonresistive metal is performed by cathode sputtering of the triode type.

3. A method as claimed in claim 1 or 2, wherein said nonresistive metal is aluminium.

4. A method as claimed in claim 1, wherein the thickness of the nonresistive metal deposit is within the range of 5 to 10$\mu$.

5. A method as claimed in claim 1, wherein said heat-conducting adhesive constitutes a thin layer having a thickness of the order of 0.03 mm.

6. A method as claimed in claim 1, wherein said metal piece is the pole-piece of a magnet which serves to polarize the ferrite.

7. A method as claimed in claim 6, wherein said ferrite is a lithium ferrite.

8. A method of fixing a ferrite to a metal piece for a high-power microwave device in which the behavior of the ferrite microwave device as a function of power is dependent on the temperature finally attained by the ferrite, comprising the steps of depositing a non-resistive metal on the face of the ferrite to be fixed; bonding the metalized face of said ferrite to the metal piece by means of a heat conducting adhesive, whereby said fixed ferrite in said high power microwave device is not subject to microwave losses and minimizes such losses at the surface of the ferrite and is capable of operating at said temperature finally attained in said high power microwave device.

* * * * *